United States Patent [19]

Kromrey

[11] Patent Number: 4,940,563
[45] Date of Patent: Jul. 10, 1990

[54] MOLDING METHOD AND APPARATUS USING A SOLID FLOWABLE, POLYMER MEDIUM

[75] Inventor: Robert V. Kromrey, Campbell, Calif.

[73] Assignee: United Technologies Corporation, Hartford, Conn.

[21] Appl. No.: 201,345

[22] Filed: May 26, 1988

Related U.S. Application Data

[63] Continuation of Ser. No. 829,048, Feb. 13, 1986, abandoned.

[51] Int. Cl.⁵ .............................................. B29C 43/02
[52] U.S. Cl. ..................................... 264/257; 264/313; 264/320; 419/1; 419/66; 419/68; 425/78; 425/383; 425/384
[58] Field of Search ............... 264/570, 544, 320, 325, 264/313, 500, 331.11, 257, 258; 419/1, 66, 68; 425/78, 383, 384, 387.1, 405.1, 405.2, 407, DIG. 14, DIG. 44

[56] References Cited

U.S. PATENT DOCUMENTS

| | | | |
|---|---|---|---|
| Re. 31,355 | 8/1983 | Rozmus | 419/49 |
| 3,249,964 | 9/1963 | Shaler | 18/5 |
| 3,279,917 | 11/1963 | Ballard et al. | 75/22 |
| 3,363,037 | 1/1968 | Levey, Jr. et al. | 264/125 |
| 3,419,935 | 12/1966 | Pfeiler et al. | 18/5 |
| 3,462,797 | 11/1966 | Asbury | 18/34 |
| 3,556,201 | 1/1971 | Sander | 425/407 |
| 3,843,601 | 10/1974 | Bruner | 260/46.5 |
| 3,968,862 | 7/1976 | Gorges et al. | 188/1 C |
| 4,011,929 | 3/1977 | Jeram et al. | 188/268 |
| 4,041,123 | 8/1977 | Lange et al. | 264/332 |
| 4,167,430 | 9/1979 | Arachi | 264/313 X |
| 4,264,556 | 4/1981 | Kumar et al. | 264/314 |
| 4,388,263 | 6/1983 | Prunty | 264/257 |
| 4,428,906 | 1/1984 | Rozmus | 419/48 |
| 4,501,718 | 2/1985 | Bradt | 419/49 |
| 4,504,044 | 3/1985 | Shtarkman | 267/35 |
| 4,547,337 | 10/1985 | Rozmus | 419/49 |

FOREIGN PATENT DOCUMENTS

2134168 1/1973 Fed. Rep. of Germany ...... 264/320

OTHER PUBLICATIONS

AGM-130 Propulsion Module Proposal 84-32, vol. 3, Cost and Pricing Proposal.
AGM-13 Propulsion Module Proposal 84-32A.
Reference Reply 54-931-1934.
Space Transportation System Solid Rocket Motor Second Source Study.
Air Force Checks Compatability of Rockwell AGM-130 with F-111.
FAC Jul. 30, 1987, Part 2, Definitions of Words and Terms.
*Plastics World*, "Silicone Rubber Puts on Squeeze for High Quality Composite Layups", 1975 by Cahners Publishing Company (pp. 45-47).

*Primary Examiner*—Jan H. Silbaugh
*Assistant Examiner*—Mary Lynn Fertig

[57] ABSTRACT

An article is molded by contacting it with a solid polymer medium, such as an especially low strength unfilled silicone rubber which is solid and able to flow readily. Thermal expansion of the medium or mechanical force is used to create molding pressure and thereby provides a substantially uniform pressure on the article precursor. Various temperature and pressure cycles can be attained; constant high pressures can be maintained on the article precursor during cooldown, optionally aided by flowing of medium to and from a vessel in which the article precursor is being molded. The method is particularly adapted to molding filler or fiber reinforced thermosetting polymer composite articles.

39 Claims, 3 Drawing Sheets

MOLDING METHOD AND APPARATUS USING A SOLID FLOWABLE, POLYMER MEDIUM

This is a continuation of application Ser. No. 829,048, filed Feb. 13, 1986, now abandoned.

TECHNICAL FIELD

The present invention relates to molding methods and apparatus and specifically to molding articles under pressure in a pressure vessel.

BACKGROUND ART

Composite materials are of great current interest because they provide a very favorable combination of high strength and low density. Typically, a composite material is comprised of fibers of graphite, boron, glass, and the like embedded within an epoxy, phenolic or other polymer resin matrix. The more advanced composites which have particularly favorable high strength to density ratio properties are especially attractive for aerospace applications. But typical of other advanced aerospace materials they present comparative processing difficulties; they cannot be made by a simple layup of the fibers and resin followed by room temperature curing. Aerospace composite materials not only involve more difficult-to-fabricate resins but often essentially defect-free finished parts must be produced. As a result, aerospace composites are typically molded and cured at elevated temperatures under substantial pressure.

A desired molding cycle can be obtained by compression molding, whereby composite prepreg materials are placed between the heated platens of a unidirectionally-acting press. But, metal compression molding dies can be expensive for complicated shapes. Lower cost rubber compression dies tend to be thick and insulative, slowing cure time. More importantly, with either type of die, complex surfaces will not be subjected to uniform pressure.

To overcome these limitations, parts are molded while being subjected to isostatic pressure. In a widely used procedure, the prepreg for the article is placed in an evacuated impervious flexible bag and subjected to simultaneous heating and isostatic pressure from a gas or a liquid. To give shape to the composite article the prepreg is often adhered to a rigid structure, such as a metal piece. Problems are connected with this process: any leak in the evacuated bag either lessens the requisite pressure on the article or allows interaction between the pressurizing medium and the partially cured polymer. In fact, such leaks are not uncommon and the resultant rejection rate is significant, especially at higher molding temperatures and pressures.

To overcome some of the aforementioned limitations, use has been made of pressure pad molding. See the article "Silicone Rubber Puts on the Squeeze for High Quality Composite Layups", *Plastics World*, June 16, 1975 (Cahners Publishing Co., Inc., Boston, Mass.). In this process, use is made of shaped pads of a high thermal expansion silicone rubber, such as the Silastic J type tooling rubber of Dow Corning Corporation, Midland, Mich. USA. The uncured prepreg is contained within a space between abutting adjacent pads and the assembly is captured in a closely fitting closed metal vessel. The vessel and contained assembly are then heated to an elevated temperature to both cure the article and expand the rubber. Since a typical silicone rubber has a thermal expansion coefficient of about 18 times higher than that of both a typical steel vessel and the typical composite article material, upon heating the expanding trapped rubber subjects the composite material to a substantial pressure, thus desirably forming the part.

The pressure pad molding technique is advantageous in that it can overcome the leakage problems of isostatic pressing. Any bag leak does not adversely affect the molding pressure or cause interaction. However, a problem with the pressure pad method is the interdependency of temperature and pressure; many desired temperature-pressure cycles are not obtainable (e.g., sustaining pressure on cooling). Another problem is that the temperature-pressure cycle is a function of the mechanical fit between the various system components; a chosen cycle will vary when there is a small change in the dimensions of the several components. For example, at room temperature the pad usually is volumetrically 6%-8% smaller than the metal vessel interior, to avoid excessive peak pressures. But, at peak temperature, a change in this dimension from about 7% to 8.2% in a typical situation will change the maximum pressure from about 7.2 MPa to 1.7 MPa. Consequently, when a pressure pad is replaced with a new pad not having precisely the same dimensions, or when there is some permanent set of the rubber with use, a different temperature-pressure cycle will be undesirably produced. In many of the more advanced composite systems, the foregoing are significant disadvantages of the pressure pad method.

Isostatic pressure vessels for molding are also widely used. Typically, the vessels are strongly made, as shown by U.S. Pat. No. 3,419,935 to Pfeiler et al. As a general proposition, various gases from an external source are used to apply the molding pressure to the article which is contained in an evacuated bag. While a gaseous medium is typically characterized by a relatively low thermal conductivity, convective heat transfer can ordinarily cause temperature variations as referred to in the Pfeiler patent. In the liquid isostatic pressing method, a liquid medium such as water is used to apply pressure to the article in the same manner as employed with gas. The heat transfer phenomena are similar.

Isostatic pressing has been widely used in the powder metal and ceramics field as well as in the polymer field. See for instance, U.S. Pat. No. 3,462,797 to Asbury and U.S. Pat. No. 3,279,917 to Ballard et al. There is a great variety in the design of isostatic pressing devices insofar as heating techniques, but as a general proposition, heating of the walls of the higher operating temperature systems is avoided.

The pressure pad technique described above has been used to mold polymers in particular because it offers improvements over fluid isostatic pressing. Pressure pad molding uses a pressure vessel but the pressure vessel need not be gas or liquid tight; the vessel is nearly filled with a silicone tooling rubber having within it a cavity in which the article being molded is placed. The cavity shapes the part and it is for this reason that tooling rubber is used. Tooling rubber is a filled elastomer having comparatively good strength and resistance to abrasion and deformation. Upon heating of the vessel, the rubber and article contained therein, the differential expansion between the high coefficient of expansion rubber and the low coefficient of expansion steel causes the rubber to seek to expand beyond the confines of the vessel, thereby increasing the pressure on the article contained therein. However, because of the strength characteristics of the tooling rubber, this method does not tend to produce an isostatic force on the article. Rather, uneven force is produced according to the local variance in fit and shape between the vessel, rubber piece, and article precursor.

U.S. Pat. No. 4,264,556 to Kumar et al "Thermal Isostatic Densifying Method and Apparatus" describes a special isostatic pressing vessel and process wherein a medium such as water or liquid bismuth may be placed in a vessel surrounding the article precursor, and the pressure is varied by adding or extracting thermal energy from the fluid medium to change its volume or its state from solid.

As mentioned above, when gases and liquids are used to apply pressure to an article, obvious problems arise when there is leakage of the bag or closure in which the article precursor is contained. If there is leakage in the bag, the pressure applied to the article precursor is lost. And even if very small leaks are compensated for by continuous evacuation of the article precursor bag there can be pressure gradients or chemical interaction with the material being molded. In the pressure pad molding method, there has been employed general heating of the entire vessel and contents, and this is often inconvenient. The pressure pad molding method apparatus does not tend to produce uniform or isostatic forces on a article precursor, as mentioned above. Fit of the rubber in the vessel is critical in limiting peak pressure. And most importantly, there is no possible independent control of pressure other than by means of the average temperature of the rubber. This leads to limitation on choice of cycle, especially on cooldown.

Accordingly, what is needed in this art is a method and apparatus which overcomes these problems of the prior art.

DISCLOSURE OF THE INVENTION

The present invention is directed to a method of forming an article from an article precursor comprising, placing the article precursor within a pressure vessel, substantially filling the vessel with a solid, flowable, polymer medium, and causing the medium to produce a substantially uniform, predetermined medium pressure on the surface of said article precursor. The polymer medium typically has low Young's modulus, low shear strength and a positive coefficient of thermal expansion. The uniform predetermined medium pressure on the article precursor is produced by such things as mechanical means, heating of the article which can incidentally heat the medium in the vicinity of the article precursor, and/or heating the medium itself, e.g. in an area remote from the article precursor. The medium pressure can additionally be controlled by cooling the medium, in at least one selected area.

Another aspect of the invention is a method of forming a filler or fiber reinforced resin article by placing the article precursor within a pressure vessel, substantially filling the vessel with the solid, flowable, polymer medium, heating the article precursor to a predetermined temperature, and causing the medium to produce a substantially uniform, predetermined medium pressure on the surface of the article precursor.

Another aspect of the invention is an apparatus for forming an article from an article precursor comprising an essentially closed pressure vessel for containing the article and the polymer pressure medium, said vessel substantially filled with the solid, flowable, polymer medium, the medium substantially filling interstices within the vessel not otherwise occupied by the article precursor. The medium is capable of producing a substantially uniform, predetermined medium pressure on the surface of the article in response to heat or pressure.

The foregoing and other objects, features and advantages of the present invention will become more apparent from the following description and accompanying drawings.

BEST MODE FOR CARRYING OUT THE INVENTION

Figure 1:
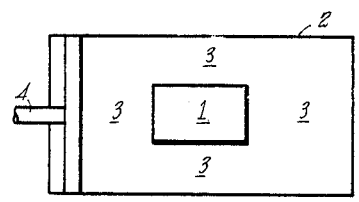
FIG. 1 shows schematically an apparatus for performing the method of the present invention by controlling the pressure on the article to be molded by a mechanical means such as a piston.

Referring to the Figures, FIG. 1 demonstrates schematically a method and apparatus according to the present invention wherein an article 1 is placed in a pressure vessel 2, such as stainless steel, and surrounded with polymer medium on that side of the article precursor to which pressure is to be applied 3. In this particular embodiment, it is not necessary to include a heating source either internal or external to the pressure chamber. This embodiment is useful for such things as molding or laminating where the adhesive (e.g. in the case of lamination or bonding), polymer, or metal binder is activated simply under pressure at room temperature conditions. A plunger 4 is shown to apply the requisite, uniformly distributed medium pressure to the article to be molded. Such things as conventional pressure transducers can be be inserted in various places within the chamber to detect the requisite pressure. While any pressures can be used with the present invention typically pressures up to 2000 pounds per square inch (psi) are required for molding such things as composite materials.

Figure 2:
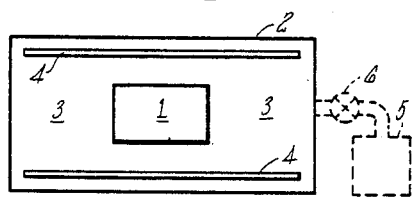
FIG. 2 shows schematically an apparatus for carrying out the method of the present invention by controlling the pressure on the article by heating means, optionally including an additional chamber to either provide additional medium to the main molding chamber or serve as an overflow to receive medium from the chamber.

In FIG. 2 the article to be molded 1 is again placed within the pressure vessel 2 and surrounded with the solid, flowable, polymer medium 3. In this instance however, heating means 4 is used to increase the pressure of the polymer medium on the article to be molded. By raising the temperature of the medium, the pressure on the article is increased. Optionally shown is an additional supply vessel 5 with the valve 6 which can be either a one way, overflow-type valve, or a two way valve to provide polymer material to the main molding chamber or take overflow if a requisite, predetermined pressure is desired. The heating means can be any conventional platens or coils, resistance heated, steam heated or heated by other conventional fluid transfer medium such as gases or oils.

Figure 3:
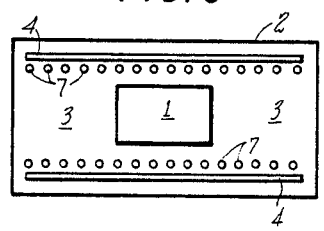
FIG. 3 shows an apparatus for carrying out the method of the present invention utilizing heating means to heat the medium and cooling means to cool the medium to control the pressure on the article to be molded.

FIG. 3 is similar to FIG. 2 except for the addition of cooling tubes 7 which can additionally be used to better control the temperature of the medium and therefore the pressure on the article to be molded 1. If the temperature is either rising too high or at too rapid a rate to maintain the uniform pressure on the article, the temperature of the cooling tubes can be adjusted accordingly to modify the temperature, and therefore pressure generated by the medium. These tubes can be of conventional metal, or plastic construction and conventional coolants can be flowed through them, such as water, Freon TM solvents (DuPont), various gases such as nitrogen, etc.

Figure 4:
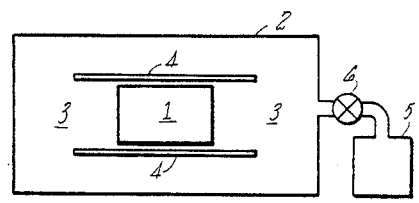
FIG. 4 shows schematically apparatus for carrying out the present invention including heating means in the vicinity of the article to be molded to provide heat to the article and also provide heat to the polymer medium in the vicinity of the article to be molded. The chamber for containing polymer medium to be supplied to the main chamber or receive overflow from the main chamber is also shown.

FIG. 4 is a construction similar to FIG. 2 except that, in this instance, the heating coils or platens 4 shown schematically, are placed in close proximity to the article to be molded. This provides heat directly to the article, for example in those instances where a thermosetting material, such an epoxy resin, is used in the construction of the article to be molded and curing is required. Additionally, the heat from these platens or coils can be used to adjust the pressure on the article to be molded. The use of the auxiliary chamber 5 and valve 6 are as in FIG. 2.

Figure 5:
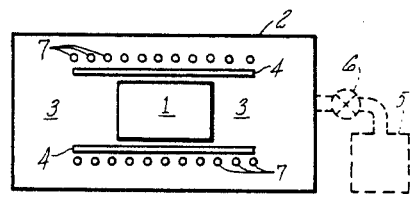
FIG. 5 is similar to FIG. 4 including cooling means to control the pressure of the polymer medium on the article to be molded.

In FIG. 5, an apparatus similar to that in FIG. 4 is shown with the addition of cooling means 7 to control the temperature in and around the article to be molded and the temperature of the medium to better control the pressure on the medium through the molding cycle.

Figure 6:
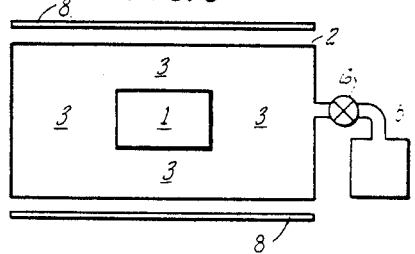
FIG. 6 shows schematically an apparatus for performing the method according to the present invention including heating means external to the molding chamber for controlling pressure of the medium within the chamber on the article to be molded.

FIG. 6 demonstrates an embodiment of the present invention which contains no internal heating means. In this embodiment the article to be molded 1 is placed within a pressure vessel 2 and filled with polymer medium 3. Additional supply of medium 3 or available space in auxiliary chamber 5 is provided accessable through valve 6 to insure the proper pressue on the article 1 through medium 3. Although the auxiliary chamber and valve arrangement is shown throughout the drawings, one skilled in the art could use other conventional means of insuring the proper pressure provided by the medium such as a spring loaded valve or plunger arrangement somewhat as shown in FIG. 1. This would enable an entire assembly to be loaded onto a sheet or tray and placed in a oven for curing through external heating means 8 as shown in FIG. 6.

Figure 7:
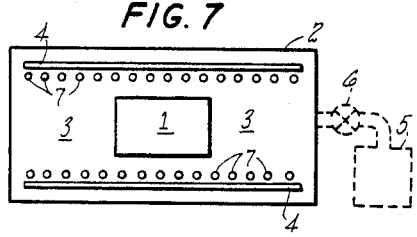
FIG. 7 shows an apparatus according to the present invention including heating means and cooling means remote from the article to be molded to control the pressure on the article.

In FIG. 7 an arrangement similar to that in FIG. 5 is demonstrated, the difference being that the heating means is remote from the article 1 therefore primarily useful for heating up and expanding the polymer medium to increase the pressure on article 1 as opposed to primarily heating article 1. The cooling means 7 would have a similar function as that shown in the apparatus of FIG. 5 insofar as cooling the polymer medium to produce contraction or lessening of the pressure provided by the medium.

Figure 8:
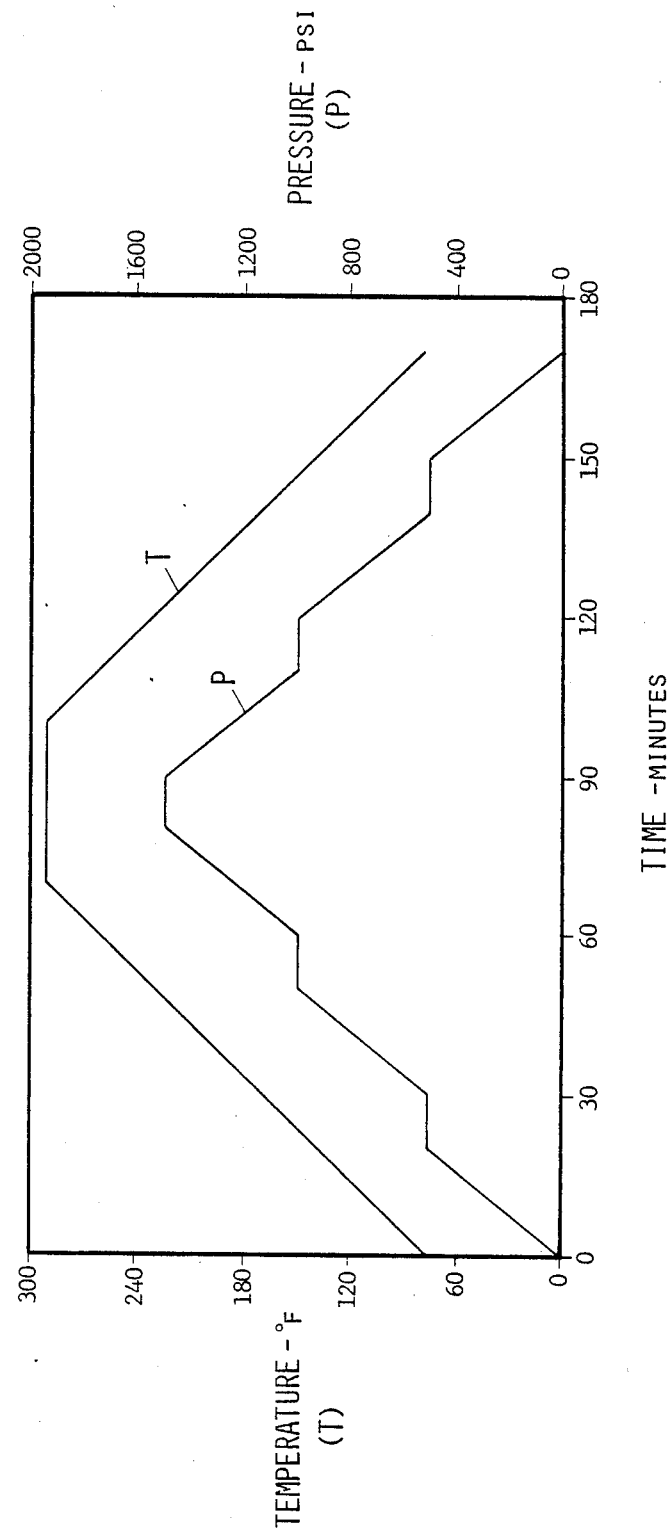
FIG. 8 shows a typical pressure and temperature versus time cycle for an article molded according to the present invention.
Figure 9:
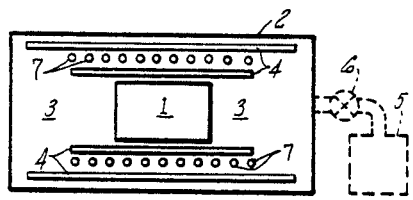
FIG. 9 shows an apparatus according to the present invention including heating means in the vicinity of the article and heating means and cooling means remote from the article to be molded to control the pressure on the article.

The degree of control which can be exercised by the above systems, and especially those with heating, cooling and volume expansion or additional medium supply capacity (for example shown in FIG. 7) is further underscored by reference to FIG. 8. This figure demonstrates data from an actual run which shows the sharp pressure steps and temperature variations which can be controlled over time by the method and in the apparatus of the present invention. FIG. 9 is similar to FIG. 5 except for the additional heating means 4 remote from the article primarily useful for heating up and expanding the polymer medium to increase the pressure on article 1.

As stated above, the particular medium useful in the present invention is a critical component to the apparatus. Its extreme responsiveness to temperature and pressure coupled with its flowability and solid nature enable it to be so useful with the present invention. These properties cause the medium to produce the extreme advantage of substantially uniform, controllable pressure on the surface of the article precursor. And while this material is described in terms of a polymeric material, other materials which would have all of the characteristics and produce similar results could be substituted. In a typical embodiment of the invention, the medium is an unfilled silicone rubber particulate of $-4+30$ U.S. mesh sieve size (4.7–0.42 mm), which when pressurized, is sufficiently self-compliant to coalesce as an essentially void free medium at a pressure of the order of 69 kPa (10 psi). Other preferred materials coalesce at less than 350 kPa. The invention is typically carried out by generating pressure in the medium at a point remote from the article precursor by mechanical means, or by thermally expanding the medium relative to the vessel.

The aforementioned behavior of the medium enables the fabrication of intricately shaped composite polymer parts with uniform properties because of the controlled and independent application of uniform pressure and temperature. In one embodiment of the invention the polymer has a Shore A hardness of less than about 15, typically less than 8, and desirably less than 1; the compressive strength is less than 3 MPa, typically less than 1 MPa, and desirably less than 0.2 MPa.

The medium flow properties are very important to the present invention and have been characterized by a specific test: In particular, the medium will tend to have a nominal flow rate of at least 0.6 gram/second (g/s) through a 1.1 centimeter (cm) diameter by 7.5 cm long pipe under an applied pressure of 10.34 MPa (1500 psi); typically the flow rate will be more than 6 g/s. The foregoing properties appear to be those which characterize a medium which flows to, from, and within a vessel in which the article precursor is contained.

The present invention enables particularly good and independent control over the temperature of the article precursor and pressure to which the article is subjected because the medium is heat insulating and provides substantially uniform pressure and enables sustaining of pressure during cooldown. Because the medium is solid, the article being molded need not be sealed in a manner which is impervious to gas or liquid, greatly alleviating problems with prior art methods such as bagging. The articles produced are considerably more uniform in properties, especially when of complex shape, compared to articles produced by the prior art pressure pad method for example. Because the medium is flowable and allows the mass contained within the pressure vessel to be varied during molding, the method surmounts problems associated with permanent set of the rubber used in such things as the pressure pad technique.

In the general practice of the invention, the article to be molded is placed in the pressure container where it is subjected to pressure from the solid medium having the special characteristics. Typically, the article is heated and a tool or the like imparts shape to one surface of the article. The tool can be a surface on which the article precursor is laid up on in a central portion of the pressure vessel and the active medium pressure can be toward the tool, or the tool surface can be the walls of the vessel itself and the active medium pressure would be directed toward the walls of the vessel, or any combination. In fact, one of the beauties of the polymer pressure medium is that the pressure can be provided in uniform fashion in any direction because of its solid nature and flowability. As mentioned above, this is particularly important for articles of complex shape which are only difficultly molded with systems much more complicated than that of the present invention. Initially, when composites are being molded, the article is a prepreg, an uncured combination of filler or fiber and resin. The vessel is filled with medium so that it surrounds the article and the vessel is sealed. Then the article precursor is heated while the medium is pressurized, according to the temperature-pressure cycle desired. The characteristics of the medium and the apparatus used enable any desired combination of temperature and pressure, limited of course by the thermal stability and capabilities of the materials of the vessel, medium, article, and other devices which may be employed.

Typically, a silicone rubber is used as part of the molding apparatus and is referred to as the pressurizing medium or the medium. Most preferably the rubber is an improvement on the type which is described in U.S. Pat. No. 3,843,601 to Bruner. See also U.S. Pat. No. 4,011,929 to Jeram et al. The disclosures of both patents are hereby incorporated by reference. Generally, the preferred materials are dimethylsilicones that have vinyl groups. They may be produced by conventional commercial procedures, including production from polysiloxanes using various vulcanizing techniques. A preferred material which has been used thus far is the experimental unfilled silicone rubber material designated as No. 6360 B1 (more simply 6360 hereinafter), by the Dow Corning Corporation, Midland, Mich., U.S.A. The 6063 silicone rubber is characterized by low strength and high friability. The 6360 material has a Shore A hardness of less than 1 (Shore 00 hardness of 50–55) and compressive strength of the order of 70 kPa when measured on a 2.5 cm square by 1.27 cm thick specimen, and upon a compression deformation of about 40 percent it shears into smaller particles. This behavior is contrasted with that of more conventional rubbers which have higher strength, greater resistance to deformation and greater elongation to failure. For example, Dow Corning Silastic E rubber is filled and has a compressive strength of more than 200 MPa and starts to fail at about 80 percent compression. It has also been observed that preferred polymer medium useful with the present invention forced through a small orifice, or through a 1.1 cm diameter pipe as described below, has a tendency to disintegrate into smaller particulate. By example, it is found that over time a nominal 30 mesh size powder having about 100 weight percent greater than 20 mesh will change to one having only about 40 weight percent greater than 20 mesh. By "high friability" is meant there is such low strength that moderate size solids tend to disintegrate into smaller particulates when subjected to modest mechanical forces, even rubbing between the fingers. The reasons the peculiar characteristics of the medium seem desirable will become evident as their use is now described.

The following illustrates how an article can be molded. A composite article, such as one made of the phenolic resin SE 1008 (Borden Chemical Company, Columbus, Ohio, U.S.A.), and CCA carbon (HITCO, Gardena, Calif., U.S.A.) is placed as prepreg within a steel pressure vessel. The article is surrounded by an 0.15 mm thick impervious nylon bag and is laid against a die having internal heaters. The bag is preferably but not mandatorily leak tight and is connected to a conduit which penetrates through the wall of the vessel. The end of the conduit may be vented to atmosphere or connected to a vacuum pump. The vessel is filled with a mass of 6360 elastomer, preferably in the form of particulates, having a particle size in the range of −4+35 U.S. sieve size (4.7–0.42 mm average particle size) and a thermal expansion coefficient about 18 times greater than that of the steel vessel.

To mold the article, it is subjected to a desired typical temperature cycle and pressure cycle, e.g., as is indicated in FIG. 8. The cycles start and ends at ambient temperature and atmospheric pressure. The first step is to thoroughly heat and soften the molding compound of the prepreg by gradual application of heat, accompanied by application of a relatively low pressure in the range 70–350 kPa to consolidate the prepreg mass. The initial pressure may be higher, but care must be taken to not crush or otherwise disrupt the reinforcement fibers of a typical composite material. When the part reaches and is held at 82° C., the pressure is increased at a controlled rate, typically 7–14 kPa per minute, until peak pressure of about 10.3 MPa is reached. This step is sometimes called "de-bulking". Then, the temperature is raised and held at 116° C. to accomplish resin gelation. In this step, the viscosity of the resin is comparatively low and the resin flows to create a dense article. Simultaneously, volatile materials are being removed from the prepreg, e.g. by means of a conduit. After completion of the gelation step, while the pressure is held constant, the temperature is increased at a rate of about 1–1.5° C. per minute. The part is then held at a final cure temperature of 160° C. for 1–6 hours to polymerize the resin. When the desired polymerization and cross linking are obtained, the cool down part of the cycle is commenced. First, the temperature is lowered to 82° C. at a controlled rate while full pressure is maintained. Then, the pressure is lowered at a relatively gradual controlled rate on the order of 21–35 kPa per minute to atmospheric pressure, whereupon the article can be removed from the vessel. Measurements within the vessel and across the article surface will show that despite thermal gradients in the vessel there are pressure gradients of less than 350 kPa, typically less than 210 kPa.

Referring to FIGS. 4 and 5 it will be appreciated that to achieve the foregoing cycle, a tool holding the article precursor could be heated to thereby heat the article. Although the heat transfer of the unfilled rubber is relatively poor, as an alternative the entire vessel could be heated. Another alternative is to place heaters in the medium in proximity to the article to conductively heat it as in FIGS. 4 and 5. Combinations of the foregoing and other variations can be employed. Since the exemplary rubber has a relatively high expansion coefficient, the heating of the rubber will tend to cause relative expansion of the material within the vessel, and thereby increase the pressure. To avoid having a pressure too high, medium can either be cooled remote from the article precursor (see FIGS. 3, 5 and 7), or it can be allowed to vent into the auxiliary chambers. If instead the pressure is found to be insufficient, then the medium can be heated higher near and/or remote from the article precursor or additional medium can be forced into the vessel; this latter step is particularly useful to obtain the desired pressures on cooldown. Note the figures, especially FIGS. 2 to 7 and 9. Although in the figures a valve is shown to control flow of the polymer medium to and from the molding chamber one skilled in this art could use other conventional transfer mechanisms to move medium in and out of the molding chamber other than heating, cooling, or valves, such as conventional plungers or pumps.

The mass of medium within the vessel can be controlled otherwise than by the particular apparatus shown. For example, the pressure in the chamber can be controlled by means other than a piston, including by heating and cooling the chamber. Further, the volume of the vessel itself might be varied. In typical practice of the invention the thermally induced expansion of the silicone rubber is used to good advantage to control the pressure. This is a character of the medium which enables the carrying out of the process in a flexible way. The medium is solid, yet it is able to transmit pressure substantially uniformly or isostatically. The substantial uniformity referred to is a comparison of the polymer medium of the present invention to a prior art rubber material and methods, e.g., the Silastic E or J tooling rubber typically used heretofore. With the polymer medium of the present invention the pressure variation on the article precursor within the vessel at 6.9 MPa can be less than about 0.7 MPa; typically the variation will be less than about 0.25 MPa.

A particulate elastomer is typically used in the practice of the invention. When the 6063 medium is used as particulate solids, prior to the application of pressure the particulates are spaced apart at the article precursor surface. But when pressure is applied, the particles self-comply and coalesce into a continuous void-free body. Because of this and their inherent resilience, a uniform hydraulic-like pressure is applied to the article precursor surface. Tests show that the 6063 material will tend to coalesce upon the application of moderate compressive pressure, of the order of 70 kPa; at this point the interfacial boundaries between the particles are so essentially conformed that the compressed rubber becomes translucent instead of opaque. The 6063 material has a true density of 0.97 g/cc, an apparent bulk density of 0.5 g/cc as a −30 mesh size powder, and it is compressed to a coalesced translucent material with a density of 0.94–0.97 g/cc by the application of about 70 kPa. (Further compression of captured material, in the range 70 kPa to 13.8 MPa, shows it to have about 0.4% volume change per 10 MPa.) Under the above-described coalesced condition, there is believed to be little void, or gas (except adsorbed gas) contained in the interstices between the particulates.

Accordingly, reference to a material having a self-compliant or coalescing property herein means a material which, when in particulate form, exhibits the kind of behavior just described under pressures used during molding. This property importantly differentiates the material used in the invention from rigid metal and ceramic materials used as particulates in what is often called psuedo-isostatic pressing, e.g., see U.S. Pat. No. 4,041,123. Even under operation conditions such particles produce points of force and not uniform pressure.

Based on various molding tests and material property measurement, desirable results have been associated with mediums having low strength, the ability to self-comply under molding level pressures, and the ability to flow and exhibit hydraulic-like behavior. The tendency toward friability, compared to the Silastic tooling rubbers, has been observed and is believed associated with the flowability behavior. Other silicone rubbers than 6063 have been used up to the date of this application, and it is within contemplation that there are still other organic polymers and other materials which are either known or can be developed which will carry out the essential features of the invention. To characterize the desirable properties associated with the good molding results, comparative tests have been run on various rubbers, in molding trials on actual composite articles, in the flow test apparatus described, and in standard apparatus.

When a solid pressure pad of Silastic tooling rubber is used, even though the desired average temperature and pressure can be attained, there was a substantial differential in pressure at various points on the article and within the rubber. This is particularly pronounced in irregular article precursors. Comparative tests run on the granular 6063 material showed a maximum variation in pressure of as low as 2% at about 6.9 MPa nominal pressure; other useful materials produced pressure uniform within 10%.

The ability of the inventive medium to flow under molding pressure is believed to be especially reflective of the properties of a good medium. This characteristic allows redistribution of the medium both within and to and from the vessel; it enables control of the absolute level and variability of the pressure. And tests show it is that which distinguishes the materials of the present mediums from those which have been used heretofore in the pressure pad molding technique. The flowability property can inferentially be seen to be analogous to viscosity. But there is no evident standard test known for measuring this property of importance to the invention and therefore a test apparatus was created as described above comprised of a cylinder having a downwardly movable piston. The cylinder is filled with the rubber or other medium being tested. A replaceable pipe extends from the side of the cylinder and discharges rubber onto a weighing scale, the weight being recorded as a function of time and the pressure applied to the rubber as measured by a transducer. The pipe is a smooth stainless steel tube of 1.1 cm inside diameter and nominally 32-64 RMS (root mean square) surface finish. The pipe length is chosen as desired, with 7.6 cm and 15.2 cm being preferred.

Another Dow Corning silicone rubber, No. 93-104, without its ordinary fillers (called "93 104" herein, nonetheless) is useful. The Polygel C-1200 silicone rubber (Stauffer Chemical Company, Westport, Conn. U.S.A.), believed to be essentially the material which is described in the Bruner Pat. No. 3,843,601 is also useful with the present invention.

The usefulness of the materials is also evaluated according to the integrity of a molded finished product, it being well established that inspection will commonly show areas of low density or cracking where the proper application of pressure and temperature has not been achieved, during either the heating or cooling cycle.

Thus, generally it can be said that the medium will have flowability, i.e., mass transport can occur when molding pressures are applied. The preferred medium, when tested in the apparatus described above using 10.3 MPa and a 15 cm pipe, has a flow rate of at least 0.6 g/s, typically 6 g/s, and desirably 25 g/s. The material will generally have a Shore A hardness of about 15 or less, typically less than 8, and desirably less than 1. Preferably, the material will have a compressive strength of less than 3 MPa, more preferably less than about 1 MPa, most preferably less than about 0.2 MPa.

As mentioned above, the tendency for the preferred rubbers to be friable is thought to be desirable. By friable is meant a material which has more tendency toward disintegration than Silastic E or J rubbers.

Further, as also stated above, the preferred material, when used in particulate form, will be self-compliant and will tend to coalesce as an apparent void free body below a pressure of 350 kPa, preferably 240 kPa; more preferably about 69 kPa.

The invention has only been characterized according to the properties of some currently available materials; the data are insufficient to establish that the totality of measured properties in combination are necessary. On the contrary, to a significant extent it is believed there is a redundancy and that they independently characterize the invention.

Because the particulate is solid, of finite size, and there is no necessity to have gas or liquid present, it is no longer essential that there be a gas tight seal in the vacuum bag even while substantially isostatic conditions are achieved. Instead, the small particulate blocks any small openings and will not infiltrate the composite. Generally, the presence and pressure of the particulate will aid in the sealing of the bag. And when, after a cycle involving high pressures, a silicone rubber particulate mass is returned to its ambient atmospheric pressure, it is found that the particulates are insubstantially adhered to one another; they are easily removed from the vessel, such as by conventional vacuum means.

While it is desirable to introduce and reuse the more preferred polymers in the molding apparatus as a particulate, it is possible to introduce the materials partially or wholly as a large single solid. During molding, there can be movement of the medium within the vessel and ancillary equipment (when used). Such flow will tend to break up the medium into particles, as will any other repeated substantial deformation of the medium. Thus the phenomena associated with the use of particulates in the preferred mode will also be observed in the use of the singular solid mass.

It is desirable that the vessel contain mainly the desired polymer medium and the article being molded. However, it will be appreciated that there will be allowed other objects, particles and materials to be contained within the medium. While the material is described as being essentially void free during molding, such reference is to the absence of spaces between the individual pieces of the medium, and is not a limitation on such occasional voids as may be in the cast or formed polymer piece due to the nature of its manufacture.

While the preferred materials are unfilled silicone rubbers, other polymer materials having the desired characteristics can be used. Most silicone rubbers are temperature limited for long term use, e.g. typically up to about 400° C. However, silicone resins of the vinylmethylsiloxane and silphenylene types have been successfully tested up to about 800° C. Fillers and other adulterants can be included with and within the medium, provided the essential behavior properties are maintained.

The invention has been described in terms of the molding of a composite polymer material (e.g. conventional polyamide, polyimide, epoxy resins, and even polyetherketone and polysulfone resins, etc. filled with conventional glass fiber, graphite fiber etc.), but it should be evident that the invention will be equally applicable to the molding of other polymer materials, laminates, and to the processing of articles made of other materials, including metals (such as conventional powder metal preforms, e.g. aluminum) and ceramics. The term molding as used herein is intended to embrace all material processing in which pressure is applied to the surface of the material.

While the invention has been described in terms of a closed vessel, it will be evident that the principles of the method of the invention will permit other variations. For instance, an article may be molded in situ; as when a lining is molded within a rocket motor case. And the invention may be used in other situations where there is not a closed vessel, per se, such as when the medium is captured in a die or tool cavity during compression molding. For example, an upper female die envelops a lower male die which has a cavity that receives and shapes the article precusor. Silicone rubber medium fills the space above the article precursor within the female die. When the opposing pistons move the dies together the medium volume is changed, it is thus pressurized, and the article is molded. Thus, generally, the invention will be applicable to diverse molding situations.

Although this invention has been shown and described with respect to a preferred embodiment, it will be understood by those skilled in the art that various changes in form and detail thereof may be made without departing from the spirit and scope of the claimed invention.

What is claimed is:

1. The method of forming an article from an article precursor comprising, placing the article precursor within a pressure vessel, substantially filling the vessel with a solid, flowable, polymer medium and causing said medium to produce a substantially uniform, predetermined medium pressure on the surface of said article precursor by applying heat or pressure to the medium, wherein the temperature of the article precursor and pressure to which the article precursor is subjected are independently controlled.

2. The method of claim 1 wherein the medium has a low Young's modulus and low shear strength.

3. The method of claim 2 wherein the medium has a positive coefficient of thermal expansion.

4. The method of claim 2 wherein at least part of the uniform predetermined medium pressure on said article precursor is produced by mechanical means.

5. The method of claim 2 wherein at least part of the uniform predetermined medium pressure on said article precursor is produced by heating the medium.

6. The method of claim 2 wherein said forming additionally comprises heating the article precursor to a predetermined temperature after placement of the article precursor within the pressure vessel.

7. The method of claim 6 wherein said heating incidentally heats the medium in the vicinity of the article precursor.

8. The method of claim 7 wherein said heating produces at least part of the uniform, predetermined medium pressure on said article precursor.

9. The method of claims 4 or 5 wherein the medium is heated primarily to expand the medium in at least one selected area not at or near that occupied by the article precursor to produce at least part of the uniform predetermined medium pressure on said article precursor.

10. The method of claims 4, 5, or 6 wherein the medium pressure is additionally controlled by cooling the medium in at least one selected area.

11. The method of claims 1, 2, 3, 4, 5, 6, 7 or 8 wherein the article is a filler or fiber reinforced resin matrix composite.

12. The method of claims 1, 2, 3, 4, 5, 6, 7 or 8 wherein the article is a powder-metal preform.

13. The method of claim 9 wherein the article is a filler or fiber reinforced resin matrix composite.

14. The method of claim 9 wherein the article is a powder-metal preform.

15. The method of claim 10 wherein the article is a filler or fiber reinforced resin matrix composite.

16. The method of claims 10 wherein the article is a powder-metal preform.

17. A method of forming a filler or fiber reinforced resin article from a filler or fiber reinforced resin article precursor comprising placing the article precursor within a pressure vessel, substantially filly the vessel with a solid, flowable, polymer medium having a low Young's modulus, positive coefficient of thermal expansion and a low shear strength, heating the article precursor to a predetermined temperature, causing said medium to produce a substantially uniform, predetermined medium pressure on the surface of said article precursor, at least part of said medium pressure produced by said heating, and independently controlling the temperature of the article precursor and pressure to which the article precursor is subjected.

18. The method of claim 17 wherein said pressure is additionally controlled by heating primarily to expand the medium in at least one area not at or near that occupied by the article precursor.

19. The method of claims 17 or 18 wherein said pressure is additionally controlled by cooling the medium in at least one area remote from the article precursor.

20. The method of claim 19 wherein said pressure is additionally controlled by mechanical means.

21. The method of claim 19 wherein the resin is a thermosetting resin and said heating is sufficient to cure the resin.

22. The method of claim 19 wherein said heating is produced by resistance heating, induction coil heating, steam heating, or fluid transfer.

23. The method of claim 18 wherein the vessel, medium and article precursor are heated as a single unit.

24. The method of claim 23 wherein the pressure is additionally controlled by mechanical means.

25. Apparatus for forming an article from an article precursor comprising:
 (a) an essentially closed pressure vessel for containing the article and a mass of pressurized solid flowable polymer medium within the vessel;
 (b) means for independently controlling the temperature of the article precursor and pressure to which the article precursor is subjected; and
 (c) said vessel substantially filled with said solid flowable polymer medium, the medium substantially filling interstices within the vessel not otherwise occupied by the article precursor, said medium capable of producing a substantially uniform, predetermined medium pressure on the surface of the article precursor.

26. The apparatus of claim 25 wherein the medium has a low Young's modulus and low shear strength.

27. The apparatus of claim 26 wherein the medium has a positive coefficient of thermal expansion.

28. The apparatus of claim 26 additionally containing mechanical means for producing pressure on said polymer medium.

29. The apparatus of claim 26 including heating means to heat said polymer medium.

30. The apparatus of claim 26 including heating means to heat the article precursor.

31. The apparatus of claim 30 including heating means to heat the polymer medium an area at or near that occupied by the article precursor.

32. The apparatus of claim 29 wherein the heating means is not at or near the area occupied by the article precursor.

33. The apparatus of claims 28, 29 or 30 including cooling means to cool the polymer medium.

34. The method as recited in claim 1 wherein said solid, flowable, polymer medium has a nominal flow rate of at least 0.6 g/s through a 1.1 cm diameter by 7.5 cm long pipe under an applied pressure of 10.34 MPa.

35. The method as recited in claim 1 wherein the pressure to which the article precursor is subjected to is sustained as the article precursor's temperature is reduced.

36. The method of forming an article from an article precursor comprising, placing the article precursor within a pressure vessel, substantially filled the vessel with a solid, flowable, polymer medium and causing said medium to produce a substantially uniform, predetermined medium pressure on the surface of said article precursor by applying heat or pressure to the medium, wherein at least part of the uniform predetermined medium pressure on said article precursor is produced by mechanical means.

37. The method of forming an article from an article precursor comprising, placing the article precursor within a pressure vessel, substantially filling the vessel with a solid, flowable, polymer medium and causing said medium to produce a substantially uniformed, predetermined medium pressure on the surface of said article precursor by applying heat or pressure to the medium, wherein the medium is heated primarily to expand the medium in at least one selected area not at or near that occupied by the article precursor to produce at least part of the uniform predetermined medium pressure on said article precursor.

38. The method of forming an article from an article precursor comprising, placing the article precursor within a pressure vessel, substantially filling the vessel with a solid, flowable, polymer medium and causing said medium to produce a substantially uniform, predetermined medium pressure on the surface of said article precursor by applying heat or pressure to the medium, wherein the medium pressure is controlled by cooling the medium in at least one selected area.

39. The method of forming an article from an article precursor comprising, placing the article precursor within a pressure vessel, substantially filling the vessel with a solid, flowable, polymer medium, said medium having a nominal flow rate of at least 25 g/s through a 1.1 cm diameter by 7.5 cm long pipe under an applied pressure of 10.34 MPa and causing said medium to produce a substantially uniform, predetermined medium pressure on the surface of said article precursor by applying heat or pressure to the medium.

* * * * *

UNITED STATES PATENT AND TRADEMARK OFFICE
CERTIFICATE OF CORRECTION

PATENT NO. : 4,940,563

DATED : July 10, 1990

INVENTOR(S) : Robert V. Kromrey

It is certified that error appears in the above-identified patent and that said Letters Patent is hereby corrected as shown below:

Column 13, Claim 17, line 41, "filly" should be --filling--.

Column 14, Claim 36, line 47, "filled" should be --filling--.

Signed and Sealed this

Twenty-fifth Day of June, 1991

Attest:

HARRY F. MANBECK, JR.

*Attesting Officer*  *Commissioner of Patents and Trademarks*